(12) United States Patent
Langlois

(10) Patent No.: US 8,444,410 B2
(45) Date of Patent: May 21, 2013

(54) MOULD FOR A BLOW-MOULDING MACHINE AND METHOD OF MANUFACTURING SUCH A MOULD

(75) Inventor: Jean-Christophe Langlois, Octeville-sur-Mer (FR)

(73) Assignee: Sidel Participations, Octeville sur Mer (FR)

( * ) Notice: Subject to any disclaimer, the term of this patent is extended or adjusted under 35 U.S.C. 154(b) by 219 days.

(21) Appl. No.: 13/001,550

(22) PCT Filed: Jun. 26, 2009

(86) PCT No.: PCT/FR2009/051231
§ 371 (c)(1),
(2), (4) Date: Dec. 27, 2010

(87) PCT Pub. No.: WO2009/156698
PCT Pub. Date: Dec. 30, 2009

(65) Prior Publication Data
US 2011/0104324 A1  May 5, 2011

(30) Foreign Application Priority Data

Jun. 27, 2008 (FR) .................................... 08 03610
May 7, 2009 (FR) .................................... 09 53064

(51) Int. Cl.
*B29C 49/48* (2006.01)
*B29C 33/30* (2006.01)

(52) U.S. Cl.
USPC .... 425/522; 29/525.11; 29/527.1; 425/450.1; 425/541

(58) Field of Classification Search
USPC ............ 425/522, 541, 450.1; 29/525, 525.11, 29/527.1
See application file for complete search history.

(56) References Cited

U.S. PATENT DOCUMENTS

| 4,724,251 | A | * | 2/1988 | Rock .............................. 525/104 |
| 5,332,384 | A |   | 7/1994 | Abramat |
| 5,882,695 | A | * | 3/1999 | Starkey ......................... 425/168 |
| 6,214,277 | B1| * | 4/2001 | Saigo et al. ................... 264/443 |
| 6,981,858 | B2| * | 1/2006 | Wieder ......................... 425/107 |
| 2007/0059396 | A1 |   | 3/2007 | Miller |
| 2007/0077322 | A1 | * | 4/2007 | Sekihara et al. .............. 425/168 |

FOREIGN PATENT DOCUMENTS

DE  20 2004 011 785 U1  10/2004
EP  1 514 667 A1  3/2005
JP  01225523 A  *  9/1989

* cited by examiner

Primary Examiner — Robert B Davis
(74) Attorney, Agent, or Firm — Sughrue Mion, PLLC

(57) ABSTRACT

Mold (10) for a blow-molding machine, for molding thermoplastic containers, the mold (10) comprising several mold parts having centering features (36, 38, 50) and complementarily-shaped centering features (40, 42, 44), said centering features (36, 38, 50) and complementarily-shaped centering features (40, 42, 44) being capable of cooperating with one another, characterized in that at least a portion of at least one of the centering features (36, 38, 50) and complementarily-shaped centering features (40, 42, 44) is made or tin antifriction composite material so as to avoid lubrication thereof.

13 Claims, 4 Drawing Sheets

MOULD FOR A BLOW-MOULDING MACHINE AND METHOD OF MANUFACTURING SUCH A MOULD

CROSS REFERENCE TO RELATED APPLICATION

This application is a National Stage of International Application No. PCT/FR2009/051231 filed Jun. 26, 2009, claiming priority based on French Patent Application Nos. 08/03,610, filed Jun. 27, 2008 and 09/53,064, filed May 7, 2009, the contents of all of which are incorporated herein by reference in their entirety.

FIELD OF THE INVENTION

The present invention relates to the field of the molding of containers, notably bottles, made of a thermoplastic such as PET (polyethylene terephthalate), by blow molding or stretch-blow molding heated preforms.

More specifically, the invention relates to a mold of a machine for blow molding containers and to the method of manufacturing the mold, and to the blow molding machine comprising such a mold.

BACKGROUND OF THE INVENTION

In one configuration, a mold of such a blow molding machine comprises two half molds for forming the shoulder and the main body of the containers, and a mold bottom for forming the bottom of the containers. The two half molds are hinged relative to one another about an axis. They are moved relative to one another between a mold-closed blow-molding position and a mold-open position in which the shaped container is removed. The mold bottom is moved vertically between the mold-closed and mold-open positions.

Centering and locking components are fixed to the half molds and to the bottom to provide centering and form the molding cavity accurately thus preventing flash at the parting line.

However, the centering and locking components have to be regularly lubricated. Such maintenance operations require the blow molding installation to be stopped and, more generally, the entire container production line to be shut down.

These stoppages reduce the production rates and increase the cost of manufacture of the containers. In addition, these maintenance operations are carried out under conditions that are relatively difficult for the operators involved, notably in terms of the ambient temperature obtaining around the machine.

Furthermore, these lubricating operations sometimes contaminate the molds.

It is a particular object of the invention to eliminate these maintenance operations.

SUMMARY OF THE INVENTION

To this end, a subject of the invention is a mold for a machine for blowmolding containers made of thermoplastic, the mold comprising a plurality of mold parts comprising a centering relief and a centering relief of complementary shape; said centering relief and centering relief of complementary shape being able to collaborate with one another, at least part of at least one of the centering relief and centering relief of complementary shape comprising a composite antifriction material in order to avoid the need to lubricate it.

According to some specific embodiments, the mold has one or more of the following features:

the mold comprises three mold parts, at least two mold parts of which comprise a centering relief and a centering relief of complementary shape;

the mold comprises three mold parts each equipped with one relief out of a centering relief or a centering relief of complementary shape;

the mold comprises only two mold parts, one of them comprising a centering relief and the other a centering relief of complementary shape;

at least one relief out of the centering relief and the centering relief of complementary shape is fixed to a mold part; said fixed relief being made of composite antifriction material;

the composite antifriction material contains a plastic, and at least one relief out of the centering relief and the centering relief of complementary shape is fixed to a mold part; said fixed relief being produced by plastic injection molding;

the composite antifriction material comprises a framework, known as a reinforcement, which provides mechanical integrity;

the composite antifriction material comprises a protective element called a matrix;

the composite antifriction material is a surface coating;

the composite antifriction material contains polyetherimide;

the composite antifriction material contains lubricating compounds;

the lubricating compounds contain polytetrafluoroethylene; and the lubricating compounds contain polyphenylene sulfide.

Another subject of the invention is a method of manufacturing a mold intended for a machine for blow molding containers made of thermoplastic; the mold comprising at least two mold parts respectively comprising a centering relief and a centering relief of complementary shape; said centering relief and said centering relief of complementary shape being able to collaborate with one another; said method comprising the following steps:

machining at least two mold parts, at least one mold part comprising at least one receiving face;

injection molding at least one relief out of a centering relief and a centering relief of complementary shape in a composite antifriction material; and fixing the molded relief to the receiving face of the or each mold part.

As an alternative, the method of manufacturing a mold intended for a machine for blow molding containers made of thermoplastic, comprises a step of machining at least two mold parts respectively comprising a centering relief and a centering relief of complementary shape; said centering relief and said centering relief of complementary shape being able to collaborate with one another, said method comprising a step of applying a composite antifriction coating to at least part of at least one out of the centering relief and the centering relief of complementary shape so as to avoid the need to lubricate the mold.

BRIEF DESCRIPTION OF THE DRAWINGS

Finally, a subject of the invention is a machine for blow molding containers, notably bottles, made of thermoplastic, characterized in that the machine comprises at least one mold as mentioned hereinabove.

The invention will be better understood from reading the following description which is given solely by way of example and makes reference to the drawings in which.

DETAILED DESCRIPTION

In the remainder of the description, the terms "upper" and "lower" are defined with respect to the usual position of a mold in a blow-molding machine. These terms should not be interpreted as limiting the scope of the present invention to any one particular mold orientation.

As is known, a blow-molding machine comprises a supporting structure supporting a carousel that can be rotated about a central axis.

The carousel supports a number of molding units. Each molding unit comprises a mount 8, a mold 10 and one or more actuators to maneuver the various parts of this mold.

Other blow-molding machines, such as a linear-molding (press system) machine for example, may be used.

Figure 1:
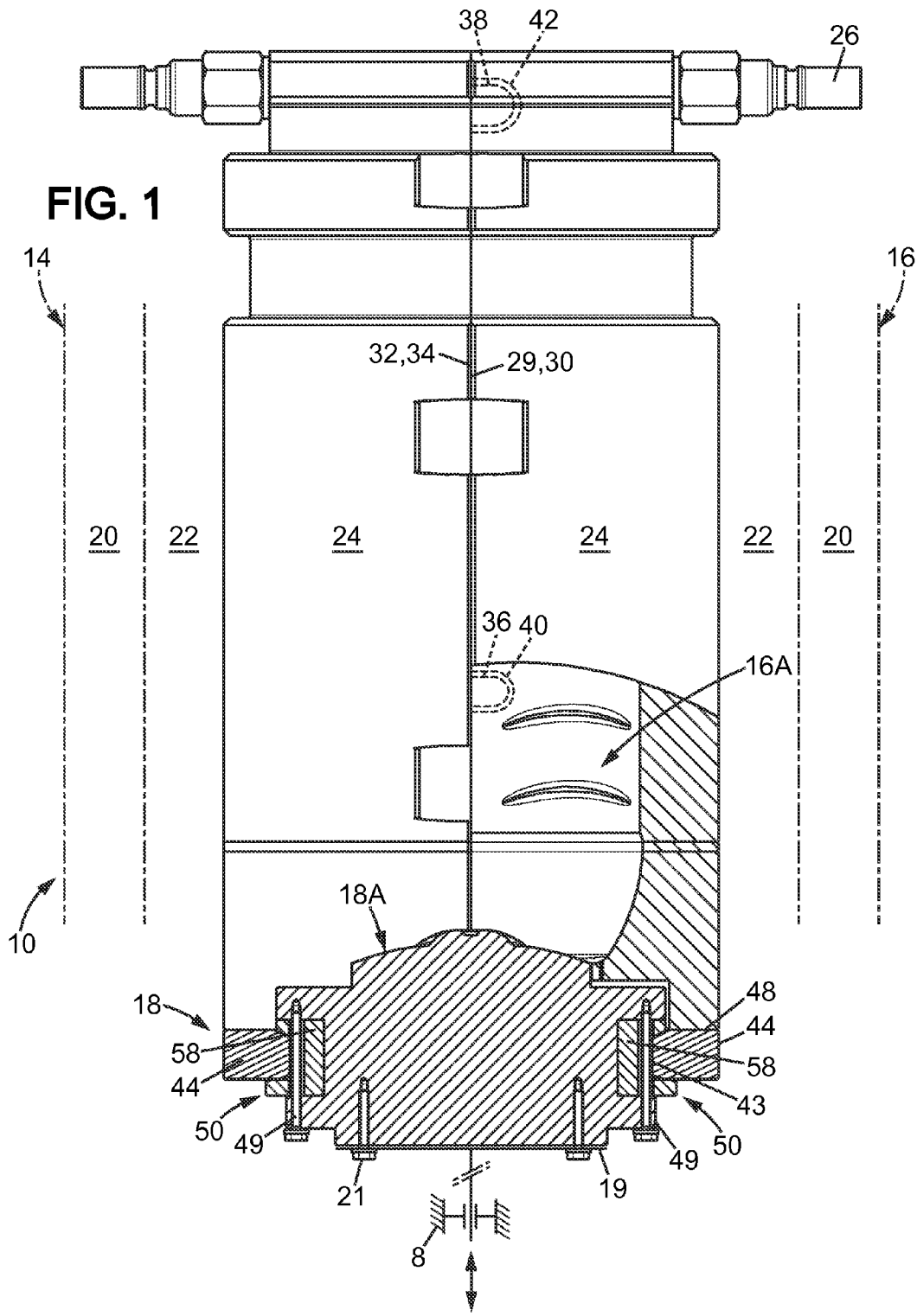
FIG. 1 is a partially sectioned view of the mold according to the invention.
Figure 2:
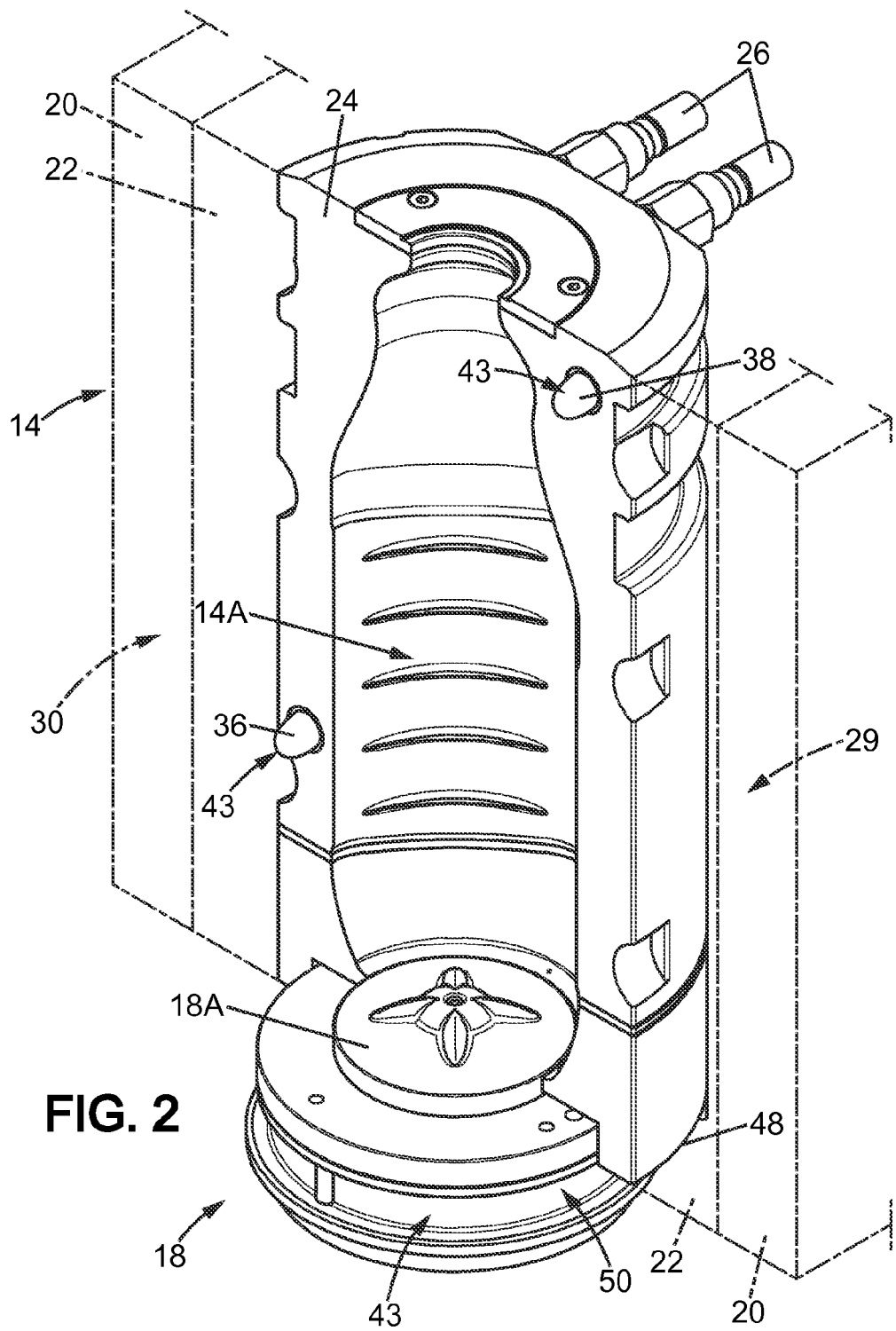
FIG. 2 is a perspective view of a three-part mold comprising two half molds and a bottom.

According to another configuration of the invention which has been depicted in FIGS. 1 and 2, the mold 10 comprises a first mold half-face 14 and a second mold half-face 16, these henceforth being known as half molds, in which a cavity 14A, 16A has been hollowed to form the shoulder and main body of the containers, and a mold bottom 18 in which a cavity 18A has been hollowed to form the bottom of the containers.

In the example illustrated, the two half molds 14, 16 are hinged relative to one another about an axis which has not been depicted. This type of mold is generally known as a hinged mold. A first drive unit, not depicted, is able to move the half molds 14, 16 between the mold-closed position in which the half molds are touching and a mold-open position in which the half molds are separated from one another to allow the shaped container to be removed.

The bottom 18 is carried by a support 19 which is able to move vertically with respect to the mount 8. The bottom 18 and the support 19 are joined together by screws 21.

A second drive unit, not depicted, is able to move the support 19 between the closed position of the mold 10, in which position the bottom 18 collaborates with the half molds 14, 16, and an open position in which the bottom 18 is moved into a position away from the half molds 14, 16.

Each half mold 14, 16 is optionally fitted with two connections 26 so that the temperature of the preforms inside the mold 10 can be regulated.

With reference to FIGS. 1 and 2, each half mold 14, 16 has a substantially semicylindrical shape. In particular, each half mold 14, 16 comprises a support 20, a shell holder 22 nesting in and fixed onto the support 20, and a shell 24 nesting in and fixed into the shell holder 22. The cavities 14A and 16A are hollowed in the internal face of the shells 24. Together with the cavity 18A of the bottom they form a molding space 28 when the two half molds 14, 16 and said bottom 18 touch.

The half mold 14 has collaborating or bearing faces 29, 30 which, in the mold-closed position, press against the bearing faces 32, 34 of the half mold 16.

The bearing faces 29, 30 of the half mold 14 are equipped with centering reliefs intended to collaborate with centering reliefs of complementary shape formed on the other half mold 16. The centering reliefs and the complementary centering reliefs may be formed on the supports 20, on the shell holders 22 or on the shells 24.

In the example illustrated, the centering reliefs 36, 38 consist of centering pins 36, 38 and the centering reliefs of complementary shape are formed of housings 40, 42 of a shape and depth corresponding to those of said centering pins.

The pins 36, 38 and the housings 40, 42 are able to key and to correctly position one half mold 14 with respect to the other half mold 16. The pins 36, 38 or the housings 40, 42 contain a composite antifriction material 43 to avoid the need to lubricate them.

Thus, no lubrication of the pins 36, 38 or of the housings 40, 42 is performed after over 10 000 000 blow molding cycles or more, or after two years of production.

According to a first embodiment of the invention, the composite antifriction material 43 contains a plastic known as a matrix.

In that case, the pins 36, 38 and/or the housings 40, 42 are produced by injection molding an insert in the form of a pin or of a socket. These are then force-fitted into holes pierced in the half mold 14 and/or the half mold 16.

As an alternative, the pins 36, 38 and the housings 40, 42 are screwed into tappings in the half molds 14, 16.

In particular, the composite antifriction material 43 contains polyetherimide (PEI) and preferably polyetherimide filled with lubricating compounds such as polytetrafluoroethylene.

The polyetherimide is also filled with glass fiber or carbon fiber, for example containing 40% of these fibers, in order to increase its rigidity.

In particular, the composite antifriction material 43 contains polyphenylene sulfide PPS.

According to a second embodiment of the invention, the component 43 is coated with an antifriction treatment such as DLC (which stands for "diamond-like carbon").

The DLC coating is then applied to the inserts that form the pins 36, 38 and/or to the inserts that form the housings 40, 42 which are, in this case, machined from steel.

As an alternative, the DLC coating is applied directly to the housing formed in the half mold 16.

This type of coating is notably described in the following documents: U.S. Pat. No. 6,303,226; U.S. Pat. No. 5,250,322 and U.S. Pat. No. 5,470,661.

Figure 4:
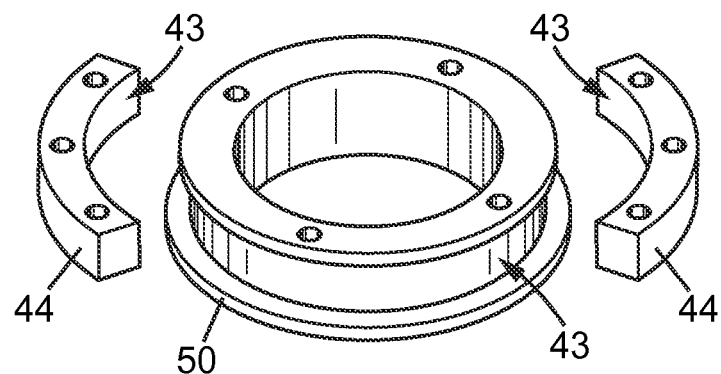
FIG. 4 is a perspective view of a wearing and positioning ring and of a portion of a wearing and centering annulus of the mold according to the invention.

As visible in FIGS. 1 and 4, a portion or segment 44 of a wearing annulus is fixed to the lower face 48 of each half mold 14, 16. This wearing annulus portion 44 is intended to collaborate with a wearing ring 50 formed around the bottom 18 in order to center and to lock the bottom 18 on the half molds 14, 16 during the closing operation of the mold 10.

To do this, a groove 58 is formed around the periphery of the bottom 18. This groove 58 is able to accept the wearing ring 50. The bottom 18 of the wearing ring 50 are joined together by screws 49.

The wearing ring 50 or the wearing annulus portions 44 contain the composite antifriction material 43 in order to avoid the need to lubricate them.

As described earlier, this composite antifriction material 43 is, according to the first embodiment of the invention, a material containing polyetherimide or, according to the second embodiment of the invention, a DLC coating or some other surface treatment or self-lubricating material.

As an alternative to the second embodiment of the invention, only part of the wearing ring 50 and part of the wearing annulus portions 44 contain the composite antifriction material 43. These parts are then those parts of the wearing ring and of the wearing annulus portion that are in mutual contact with one another.

According to another embodiment of the invention, only the wearing ring 50 or the wearing annulus portions 44 contain the composite antifriction material 43. The pins 36, 38 and the housings 40, 42 are then lubricated in the conventional way. In that case, the half mold 14 (or 16) and the bottom 18 form a first mold part within the meaning of the invention. The half mold 16 (or 14) then, completely on its own, forms the second mold part within the meaning of the invention. The wearing ring 50 constitutes the centering relief of the first mold part 14, 18. The wearing annulus portion 44 constitutes the centering relief of complementary shape of the second part 16 of the mold.

According to a final embodiment of the invention, only the pins 36, 38 and/or the housings 40, 42 contain the composite antifriction material 43. The wearing ring 50 and the wearing annulus portions 44 are then lubricated in the conventional way. In that case, the half mold 14 forms the first mold part within the meaning of the invention. The half mold 16 forms the second mold part within the meaning of the invention. The pins 36, 38 constitute the centering reliefs of the first mold part 14. The housings 40, 42 constitute the centering reliefs of complementary shape of the second part 16 of the mold.

Figure 3:
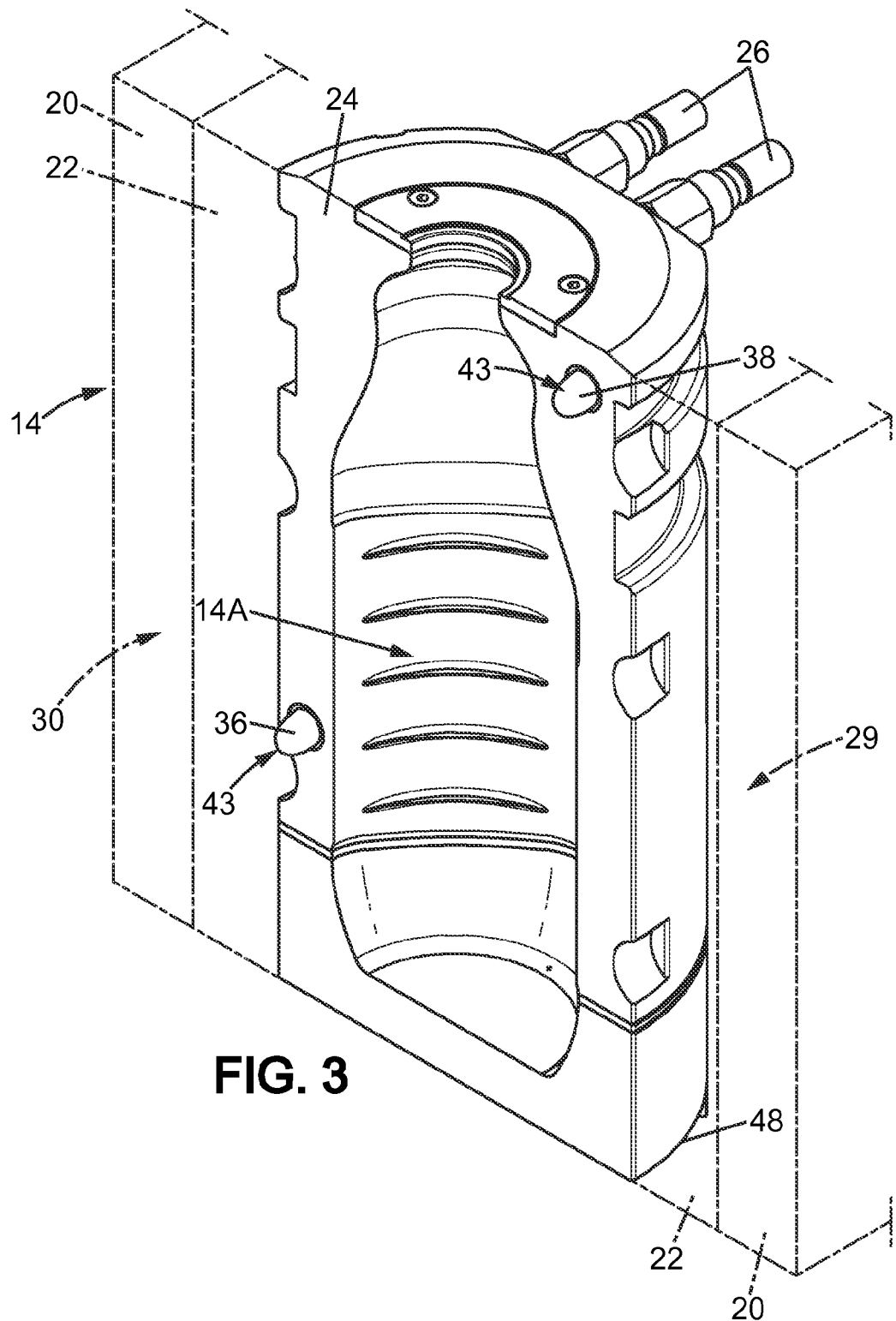
FIG. 3 is a perspective view of a two-part mold comprising two half molds.

In one possible configuration of the invention which has been depicted in FIG. 3, the mold comprises only two half molds each provided with a cavity able to form the whole of the shoulder, of the main body and of the bottom of the containers.

In this configuration, the bearing faces 29, 30 of the half mold 14 are equipped with centering reliefs intended to collaborate with centering reliefs of complementary shape on the other half mold 16. The centering reliefs and the complementary centering reliefs may be formed on the supports 20, on the shell holders 22 or on the shells 24. In that case, the half molds 14, 16 have no wearing annulus segment 44.

The invention also relates to a method of manufacturing the mold 10 as mentioned hereinabove. The method comprises the following steps:

machining two mold parts, at least one mold part comprising at least one receiving face;

injection molding at least one relief out of a centering relief 36, 38, 50 and a centering relief 40, 42, 44 of complementary shape in a composite antifriction material 43; and fixing the molded relief to the receiving face of the or each mold part.

As an alternative, the method comprises the following steps:

machining the two half molds 14, 16 and the bottom 18;

machining at least one out of the pins 36, 38, the housings 40, 42, the wearing ring 50 and the wearing annulus portions 44; and applying a composite antifriction coating 43 to at least part of a relief chosen out of the pins 36, 38, the housings 40, 42, the wearing ring 50 and the wearing annulus portions 44.

The invention claimed is:

1. A mold for a machine for blow molding containers made of thermoplastic, the mold comprising:
   at least two half molds respectively comprising a centering relief and a centering relief of complementary shape; said centering relief and centering relief of complementary shape being able to collaborate with one another,
   at least part of at least one of the centering relief and centering relief of complimentary shape comprising a composite antifriction material in order to avoid the need to lubricate said at least one of the centering relief and centering relief of complimentary shape;
   at least two wearing annulus portions fixed each to a half mold;
   a bottom adapted to collaborate with the two half molds in a position of closing of the mold;
   a wearing ring formed around the bottom; said wearing ring collaborating with the wearing annulus portions in a position of closing of the mold;
   wherein at least one part of the wearing ring or at least one part of the wearing annulus portions contains a composite antifriction material.

2. The mold as claimed in claim 1, in which at least one relief out of the centering relief and the centering relief of complimentary shape is fixed to a mold part; said fixed relief being made of composite antifriction material.

3. The mold as claimed in claim 1, in which the composite antifriction material contains a plastic, and in which at least one relief out of the centering relief and the centering relief of complimentary shape is fixed to a mold part; said fixed relief being produced by plastic injection molding.

4. The mold as claimed in claim 1, in which the composite antifriction material contains polyetherimide.

5. The mold as claimed in claim 1, in which the composite antifriction material contains lubricating compounds.

6. The mold as claimed in claim 5, in which the lubricating compounds contain polytetrafluoroethylene.

7. The mold as claimed in claim 5, in which the lubricating compounds contain polyphenylene sulfide.

8. The mold as claimed in claim 1, in which the composite antifriction material is a surface coating.

9. The mold as claimed in claim 8, in which the surface coating is a DLC coating.

10. A machine for blow molding or stretch-blow molding containers made of thermoplastic, the machine comprises at least one mold comprising:
    at least two half molds respectively comprising a centering relief and a centering relief of complementary shape; said centering relief and centering relief of complementary shape being able to collaborate with one another,
    at least part of at least one of the centering relief and centering relief of complimentary shape comprising a composite antifriction material in order to avoid the need to lubricate said at least one of the centering relief and centering relief of complimentary shape;
    at least two wearing annulus portions fixed each to a half mold;
    a bottom adapted to collaborate with the half molds in a position of closing of the mold;
    a wearing ring formed around the bottom; said wearing ring collaborating with the wearing annulus portions in a position of closing of the mold;
    wherein at least one part of the wearing ring or at least one part of the wearing annulus portions contains a composite antifriction material.

11. A method of manufacturing a mold intended for a machine for blow molding containers made of thermoplastic; the mold comprising:
    at least two half molds respectively comprising a centering relief and a centering relief of complementary shape; said centering relief and centering relief of complementary shape being able to collaborate with one another,
    at least part of at least one of the centering relief and centering relief of complimentary shape comprising a composite antifriction material in order to avoid the need to lubricate said mold;

at least two wearing annulus portions fixed each to an half mold;

a bottom adapted to collaborate with the half molds in a position of closing of the mold;

a wearing ring being formed around the bottom; said wearing ring collaborating with the wearing annulus portions in a position of closing of the mold;

wherein the method comprises the following steps:

machining the half molds, at least one half mold comprising at least one receiving face;

machining the wearing annulus portions, the bottom and the wearing ring;

injection molding at least one relief out of a centering relief and a centering relief of complimentary shape in a composite antifriction material;

injection molding at least one part of the wearing ring or at least one part of the wearing annulus in a composite antifriction material; and fixing the molded relief to the receiving face of each mold part.

12. A method of manufacturing a mold intended for a machine for blow molding containers made of thermoplastic; said mold comprising:

at least two half molds comprising respectively a centering relief and a centering relief of complementary shape; said centering relief and centering relief of complementary shape being able to collaborate with one another, at least part of at least one of the centering relief and centering relief of complimentary shape comprising a composite antifriction material in order to avoid the need to lubricate said at least one of the centering relief and centering relief of complimentary shape;

at least two wearing annulus portions fixed each to an half mold;

a bottom adapted to collaborate with the half molds in a position of closing of the mold;

a wearing ring formed around the bottom; said wearing ring collaborating with the wearing annulus portions in a position of closing of the mold;

the method comprising the steps of:

machining the at least two half molds;

applying a composite antifriction coating to at least part of at least one out of the centering relief and the centering relief of complimentary shape so as to avoid the need to lubricate the mold;

applying a composite antifriction coating to at least one part of the wearing ring or at least one part of the wearing annulus.

13. The machine of claim 10, wherein the containers are bottles.

* * * * *